Patented Jan. 26, 1932

1,842,544

UNITED STATES PATENT OFFICE

LEO FREUDER, OF CONEY ISLAND, NEW YORK, ASSIGNOR TO FIBERPLASTIC CORPORATION, OF NEW YORK, N. Y., A CORPORATION OF NEW YORK

MOLDED ARTICLE AND METHOD OF MAKING SAME

No Drawing.  Application filed May 8, 1928. Serial No. 276,188.

This invention relates to the production of reaction products of glutinous compounds and oxidizing agents containing chromium oxide and has for its principal objects the production of pressure reaction products which are of dense consistency, water insoluble, substantially fireproof, will not fuse, have an extremely high coefficient of electrical resistance and high tensile strength, is free from odoriferous ingredients adapted to impart an odor or flavor to food stuffs or other products stored therein, are peculiarly adapted for impregnation or induration of fibrous, cellular or abrasive materials in order to produce containers, insulated slabs or shapes, and which product is withal unusually cheap and durable.

In carrying out my invention, I preferably proceed as follows:—

A solution of gelatine, preferably of the grade known as hide glue, is prepared, the same comprising approximately 1000 parts of water to 100 parts of glue and to this mixture is added about 150 parts of aqueous solution containing about 9% of sodium bichromate ($Na_2Cr_2O_7$). The mixture is preferably heated to about 40° C. to 50° C. and stirred sufficiently to intimately incorporate the ingredients together in order to produce what I hereinafter term my "resin" i. e. the unadulterated pressure product of bichromated gelatine. The foregoing mixture is then evaporated to substantial dryness at low temperatures, preferably on a drum dryer operating in vacuum while heated preferably to below the coagulating point of the gelatinous or albuminous material employed, and such product is removed from the drying cylinder when almost, but not quite dry, by means of a suitable doctor or scraper blade, the drying then being completed by a current of heated air, preferably not exceeding about 50° C. The dry product is then pulverized and introduced into a hydraulic or other suitable press wherein, while confined in a mold, it is subjected to high temperature and high pressure, for example, a pressure of about 1 ton per sq. in. and a temperature of some 150° C. to 160° C. for a substantial time, say from 2 min. to 5 min. up to 45 min. or even more, depending upon the amount of material introduced into such mold. Preferably, however, instead of molding the product straight, the powdered "resin" is first mixed with a filler, such for example as wood flour or finely comminuted fibre, sawdust or abrasives, such as pumice, carborundum, alundum, glass, emery or the like in varying proportions, for example, the proportions of 50 parts of resin to 50 parts of filler, although any proportions from say 5% of filler up to some 90% of filler may be used depending upon the character of the article which it is desired to produce.

In order to produce a dense, homogeneous impregnated or indurated fibrous product from laminated sheets of fibre so in the finished product the laminations may be entirely obliterated, I preferably cause an absorbent sheet of paper or fabric, such for example as a good grade of filter paper or ordinary wrapping paper or of cotton, linen or hemp cloth, to pass through the aforesaid bichromated gelatine solution so as to thoroughly impregnate or saturate the said fibre or fabric with the solution. Then the said sheet is passed over suitable drying racks and subjected to a current of air heated to a temperature of 50° C. until the sheets are dry enough so as not to adhere to each other when the same are stacked in a pile. A stack of said sheets is then introduced into a press and preferably confined at the top and bottom between highly polished copper or like metal plates and therein subjected to a particularly high pressure, for example, a pressure of 2,000 to 2,500 lbs. per sq. in. and to a temperature of from 150 to 160° C., such pressure and temperature being maintained upon said stack of impregnated sheets for a period of a few minutes, as above specified, to 45 minutes or even more depending upon the number and the thickness of the number of sheets being compressed. Prior to relieving the pressure in the press, it is preferable to first cool the press to below 100° C., preferably to approximately atmospheric temperature, in order not only to prevent burning of the hands in handling the same, but particularly to prevent any explosion into steam of any particles of water that might still remain in the product due to insufficient drying prior to the same being introduced into the press.

My improved product, while possessing many of the advantages and qualities of various condensation products from poisonous raw materials, such as the phenol-formaldehyde resins, is not odoriferous and will not impart odors or poisonous fumes to ice cream, butter or milk stored therein or brought into proximity thereto. Furthermore, my bichromated gelatin pressure products are unusually cheap to produce, highly insoluble and in fact are water repellant. Slabs made from laminated sheets in the manner aforesaid and containing from 20% to 30% of bichromated gelatin impregnated material based on a dry weight thereof, are capable of withstanding an extremely high voltage, for example, in excess of 250 volts per thousandths of an inch in thickness as determined by the regular electrical testing machines for this purpose, when employing a current of the amperage commonly used in such testing operations.

For certain purposes, in lieu of merely employing a single solution of sodium bichromate, as above described I prepare a mixture comprising 1,000 parts of water, 100 parts of sodium bichromate and 100 parts of calcium chloride and to said gelatin solution I add 50 to 150 parts of this latter solution. Among the advantages of the employment of calcium chloride may be mentioned the fact that contrary to expectations, the material is not only highly waterproof, but it is extremely flexible and less brittle, particularly when slabs made from laminated sheets are produced in the manner herein described, than in those cases where no calcium chloride is ultimately used in the impregnated or indurated mixture. Furthermore, the employment of calcium chloride appears to, if anything, impart to the finished slab made from such laminated sheets a more completely homogeneous texture, as there is no tendency whatsoever for the sheets to maintain their original identity and to separate into layers upon the removal of the slab from the press or during the cutting or working of the slabs or blocks made from such material by means of cutting knives or planers or the like, although insofar as electrical resistance is concerned, the product produced without employing calcium chloride is found to be preferable.

Another advantage of my improved product is that fibrous sheets coated therewith and even the straight pressure resin itself can be readily printed with greasy printing inks for which this product has a peculiar affinity and also various designs, figures and illustrations can be reproduced with fidelity by means of the rotogravure or other like printing process upon slabs produced from laminated stacks of fibre or fabric.

While I preferably employ sodium bichromate various other oxidizing agents, such as potassium bichromate or ammonium bichromate are found to be well suited as a substitute therefor and likewise in lieu of gelatin may be employed casein, glue and like glutinous materials capable of forming bichromated glutinous products.

Contrary to expectations when a plurality of superimposed sheets of either fibre or fabric are coated with my improved bichromated gelatin "resin" in the manner above described and molded under high pressures and temperatures, such sheets entirely lose their identity and the entire mass of fibre or fabric resin under the high pressures and temperatures to which they are subjected become peculiarly plastic and cohere even though but relatively small quantities, say 20% to 25% of the bichromated gelatin resin, as compared with the weight of the fibre or fabric, is present. For many purposes even higher percentages of the bichromated gelatin resin may be employed in the production of slabs from laminated sheets of fabric or fibre, for example, excellent results can be obtained from 35% to 40% of such resin by weight of fibre or fabric.

While I have described certain preferred proportions and temperatures in connection with the production of my improved product, it is understood that I do not confine myself thereto, except as the same are defined and restricted by the scope of the appended claims, and therefore various changes in such proportions and temperatures may be made without departing from the scope of such claims.

While I prefer to employ a pressure of about 2500 lbs. to the square inch in molding my straight "resin" and various bodies indurated therewith, and also to subject the same while being pressed to a temperature of from 150° C. to 160° C., I may employ a lower pressure, but at least several hundred pounds per square inch, but sufficient to produce a dense homogeneous product when operating on the straight "resin" and a coherent dense mass when operating on indurated bodies. I also may employ a lower temperature but not less than 100° C. and preferably above 110° C. and sufficient to at least cause an effective reaction upon the glutinous chromic oxide reaction products employed.

By the expression "an oxide of chromium" I include not only chromic oxide, that is, chromium trioxide ($CrO_3$), but also such oxide as chromium dioxide ($CrO_2$) and any other oxide of chromium capable of effective substitution for the chromium trioxide ($CrO_3$) within the described reactions. In order to increase the acid concentration and effectiveness of the action of bichromate compound, I may add to the bichromate solution employed before its admixture with the gelatin solution a few percentages of chromic acid ($H_2CrO_4$) say 2% to 5% based on the weight of the solution, or a proportionate amount can be added to the mixture containing bichromated gelatin in solution.

In some cases it may be desirable to repass the sheets of animal or vegetable fibre which it is desired to indurate through the impregnating solution prior to subjecting the same to high pressures and temperatures and in such case obviously in order to accumulate an additional amount of indurating material on the sheets, the same should be substantially dried before repassing the same through the impregnating solution. This is preferable in those cases where the excessive increase of the concentration of the solution would result in the bichromate being thrown out as crystals, although in the presence of gelatin the tendency of bichromate to crystallize is greatly inhibited.

It may also at times be desirable to mix the filler with the bichromated gelatin in solution and then subsequently remove the water prior to introducing the same into the press, the same being, if desired, comminuted after the same are dried and before pressing.

The term "glutinous" as used in the claims refers only to glue, pure gelatine, size and like glue-like products which have the property of largely swelling with water to form adhesives and which are highly reactive with bichromates to form insoluble bichromated gelatine and these products are well recognized as being nitrogenous compositions, and therefore the term "glutinous" does not include various non-nitrogenous condensation productions such as phenol, formaldehyde, resins and the like.

Having thus described my invention, what I claim is:

1. The method which consists in reacting on a water soluble, oxidizable highly nitrogenous glutinous body in solution with an aqueous oxidizing agent, including in its composition an oxide of chromium, coating sheets of fibrous material with the resultant reaction product drying the said coated sheets and forming said sheets into a laminated mass at a temperature considerably below 100° C. and subjecting the dried mass to a high pressure which is in excess of 1,000 lbs. per square inch and a high temperature which is considerably in excess of 110° C. and thereby producing a hard, dense product which is substantially permanent and water repellant.

2. The method which consists in reacting on a water soluble, oxidizable highly nitrogenous glutinous body in solution with an aqueous oxidizing agent, including in its composition a soluble bichromate, drying mixture at a temperature considerably below 100° C. and subjecting the dried mass to a high pressure which is in excess of 1,000 lbs. per square inch and a high temperature which is considerably in excess of 110° C. and thereby producing a hard, dense product which is substantially permanent and water repellant.

3. The method which consists in reacting on a water soluble, oxidizable highly nitrogenous glutinous body in solution with an aquaqueous oxidizing agent, including in its composition a sodium bichromate, drying the mixture at a temperature considerably below 100° C. and subjecting the dried mass to a high pressure which is in excess of 1,000 lbs. per square inch and a high temperature which is considerably in excess of 110° C. and thereby producing a hard, dense product which is substantially permanent and water repellant.

4. The method which consists in reacting on a water soluble, oxidizable highly nitrogenous glutinous body in solution with an aqueous oxidizing agent, including in its composition an oxide of chromium, drying the mixture at a temperature considerably below 100° C., comminuting the same and subjecting the comminuted mass to a high pressure and a high temperature which is considerably in excess of 110° C. and thereby producing a hard, dense product which is substantially permanent and water repellant.

5. The method of making molded articles, which comprises incorporating the dry reaction product of a water soluble oxidizable highly nitrogenous glutinous body and an oxidizing agent, including chromic oxide in its composition, with a filling material, said dry reaction product being produced at a temperature below the coagulating point of the glutinous body and subjecting the mixture to a high temperature which exceeds 110° C. and pressure which exceeds 1,000 lbs. per square inch in order to consolidate the same and produce a hard, dense mass.

6. The method of making an indurated article, which comprises incorporating the dry reaction product of a water soluble, oxidizable highly nitrogenous glutinous body and an oxidizing agent including chromic oxide in its composition with sheets of fibrous material, said dry reaction product being produced at a temperature below the coagulating point of the glutinous body superimposing several sheets on another and subjecting the same to a pressure of many hundreds of pounds per square inch while heating the same to a high temperature which exceeds 110° C.

7. The method of making an indurated article, which comprises incorporating the dry reaction product of a water soluble, oxidizable highly nitrogenous glutinous body, calcium chloride and an oxidizing agent including chromic oxide in its composition with sheets of fibrous material, said dry reaction product being produced at a temperature below the coagulating point of the glutinous body superimposing several sheets on another and subjecting the same to a pressure of many hundreds of pounds per square inch while heating the same to a high temperature which exceeds 110° C.

8. The herein described product comprising bi-chromated gelatin, the same being tough, water repellant and having high coefficient of electrical resistance and resulting from subjecting dry comminuted bichromated gelatin while confined in a mold to a pressure of in excess of 1500 lbs. per square inch while heating the same in excess of 110° C.

9. The process of manufacturing a composite product which consists in superimposing a plurality of sheets of fibrous material associated with an adhesive comprising essentially a dry bi-chromated gelatine reaction product, which has been dried at a temperature well below 100° C., and then applying heat in excess of 110° C. to said superimposed sheets while subjecting the same to a pressure in excess of 500 lbs. per square inch.

10. The process of manufacturing a composite product which consists in superimposing a plurality of sheets of fibrous material associated with an adhesive comprising essentially a dry bi-chromated gelatine reaction product, which has been dried at a temperature well below 100° C., and then applying heat in excess of 110° C. to said superimposed sheets while subjecting the same to a pressure in excess of 1,000 lbs. per square inch.

11. The method of making a moldable bichromated gelatine product which consists in reacting upon gelatine in solution with sufficient bichromates to materially oxidize the same so that when the resultant product is dried and subjected to high heat and pressure, a highly inert and substantially water insoluble material is obtained, drying the resultant product at relatively low temperatures and considerably below the boiling point of water whereby a product which is highly adapted to heat molding operations is obtained.

12. The method of making a moldable glue product which comprises causing a bichromate of a compound containing chromic oxide in its composition to react upon a water soluble gelatinous body while maintaining the temperature of the mixture well below the boiling point thereof, evaporating the mixture in vacuo, delivering the liquid mixture onto a drying cylinder confined within a vacuo and heated to a low temperature and effecting the evaporation of the water from the mixture while in contact with such surface until the mixture is almost but not quite dry, then removing the mixture from the surface and completing the drying thereof in a current of heated gas at a low temperature and not exceeding about 50° C.

Signed at New York, in the county and State of New York this 3rd day of May, 1928.

LEO FREUDER.